United States Patent
Skinner et al.

(10) Patent No.: US 6,957,576 B2
(45) Date of Patent: Oct. 25, 2005

(54) SUBTERRANEAN WELL PRESSURE AND TEMPERATURE MEASUREMENT

(75) Inventors: Neal G. Skinner, Lewisville, TX (US); John R. Dennis, Bozeman, MT (US); Michel Leblanc, Plano, TX (US); Gregg Johnson, Fairfax, VA (US); Michael D. Todd, Alexandria, VA (US)

(73) Assignee: Halliburton Energy Services, Inc., Houston, TX (US)

( * ) Notice: Subject to any disclaimer, the term of this patent is extended or adjusted under 35 U.S.C. 154(b) by 31 days.

(21) Appl. No.: 10/618,328

(22) Filed: Jul. 11, 2003

(65) Prior Publication Data

US 2004/0016295 A1 Jan. 29, 2004

(30) Foreign Application Priority Data

Jul. 23, 2002 (WO) ............................... PCT/US02/23272

(51) Int. Cl.$^7$ ............................................. E21B 47/06
(52) U.S. Cl. ..................................... 73/152.51; 73/716
(58) Field of Search ..................... 73/152.51, 152.52, 73/730, 716

(56) References Cited

U.S. PATENT DOCUMENTS

| | | | | |
|---|---|---|---|---|
| 2,718,145 A | * | 9/1955 | Nisle ........................... | 73/301 |
| 3,855,857 A | * | 12/1974 | Claycomb ................ | 73/152.59 |
| 4,078,432 A | | 3/1978 | Stewart | |
| 4,366,714 A | | 1/1983 | Adorni | |
| 4,643,024 A | * | 2/1987 | Kovari et al. ............ | 73/152.51 |
| 4,738,140 A | * | 4/1988 | Kempf ........................ | 73/730 |
| 4,805,449 A | * | 2/1989 | Das .......................... | 73/152.48 |
| 4,893,505 A | | 1/1990 | Marsden et al. | |
| 5,024,098 A | * | 6/1991 | Petitjean et al. ........... | 73/729.2 |
| 5,343,963 A | * | 9/1994 | Bouldin et al. ............... | 175/27 |
| 5,386,729 A | | 2/1995 | Reed et al. | |
| 5,460,049 A | * | 10/1995 | Kirsch ......................... | 73/708 |
| 5,649,035 A | | 7/1997 | Zimmerman et al. | |
| 5,670,720 A | * | 9/1997 | Clark et al. .................... | 73/730 |
| 5,892,860 A | | 4/1999 | Maron et al. | |
| 5,925,879 A | | 7/1999 | Hay | |
| 6,016,702 A | | 1/2000 | Maron | |
| 6,246,048 B1 | | 6/2001 | Ramos et al. | |
| 6,304,686 B1 | | 10/2001 | Yamate et al. | |
| 6,351,987 B1 | | 3/2002 | Winston et al. | |
| 6,550,322 B2 | * | 4/2003 | Sweetland et al. ........ | 73/152.51 |
| 6,575,025 B1 | * | 6/2003 | Demia ..................... | 73/152.52 |
| 6,597,821 B1 | | 7/2003 | Bohnert et al. | |

FOREIGN PATENT DOCUMENTS

| | | |
|---|---|---|
| DE | 198 07 891 A1 | 8/1999 |
| EP | 0 320 039 A1 | 6/1989 |

OTHER PUBLICATIONS

Alan D. Kersey, Optical Fiber Technology 2.291–317 (19996): Article No. 0036, XP–002053711: A Review of Recent Developments in Fiber Optic Sensor Technology, Feb. 13, 1996, pp. 291–317.*

Giovanni Botto, Bruno Maggioni aned Adeimo Schenato, Society of Petroleum Engineers, XP–002082000, SPE 28484; Electronic, Fiber–Optic Technology: Future Opinion for Permanent Reservoir Monitoring: 1994, pp. 215–224.*

International Search Report for pct/us02/23272.

A. D. Kersey, et al., "Fiber–Optic Systems for Reservoir Monitoring," World–Oil, dated Oct., 1999.

* cited by examiner

*Primary Examiner*—Hezron Williams
*Assistant Examiner*—John Fitzgerald
(74) *Attorney, Agent, or Firm*—Marlin R. Smith

(57) ABSTRACT

A well pressure and temperature measurement system and method are provided. In a described embodiment, a sensor system includes multiple strain sensors attached to a structure which changes dimensionally in response to well pressure and temperature changes. The strain sensors may be fiber optic sensors. The structure may be tubular and the strain sensors may detect axial and hoop strains in the structure.

67 Claims, 4 Drawing Sheets

SUBTERRANEAN WELL PRESSURE AND TEMPERATURE MEASUREMENT

CROSS-REFERENCE TO RELATED APPLICATION

The present application claims the benefit under 35 USC §119 of the filing date of international application serial no. PCT/US02/23272, filed Jul. 23, 2002, the entire disclosure of which is incorporated herein by this reference.

GOVERNMENT LICENSE RIGHTS

The U.S. Government has a paid-up license in this invention and right in limited circumstances to require the patent owner to license others on reasonable terms as provided for by the terms of contract No. CRADA# NCRADA-NRL-99-249 awarded by The Naval Research Laboratory.

BACKGROUND

The present invention relates generally to operations performed and equipment utilized in conjunction with a subterranean well and, in an embodiment described herein, more particularly provides pressure and temperature measurement in such wells.

Pressure and temperature measurement in wells has generally been accomplished using pressure and temperature transducers which utilize separate pressure and temperature sensors. For example, a transducer may include a piezoelectric pressure sensor and a thermocouple temperature sensor.

Unfortunately, however, most methods of measuring pressure are sensitive to changes in temperature. If the temperature changes relatively rapidly, as happens many times during typical well operations, such as drill stem testing, gravel packing, etc., then it may be very difficult to accurately measure pressure in the well. For example, for the transducer described above, the thermocouple and the piezoelectric crystal may have different temperature change response rates and/or may be located in different positions in the transducer, so that the temperature indicated by the thermocouple is not necessarily the temperature of the piezoelectric crystal.

Therefore, it would be highly desirable to provide a method of measuring pressure in a well in which accuracy of the measurement is improved. The ability to eliminate the contribution of temperature change to the pressure measurement would be very advantageous.

SUMMARY

In carrying out the principles of the present invention, in accordance with an embodiment thereof, a sensor system is provided. The sensor system is an advance in the art in that it eliminates one or more problems in prior sensor systems, and/or performs more efficiently than prior systems.

Methods of measuring pressure in a well are also provided by the present invention. In one example, a pressure measuring method includes the steps of applying a pressure differential across a structure positioned in a well, and applying a temperature change to the structure. A strain in the structure induced by the pressure differential and the temperature change is detected using one sensor. A different strain, also induced by the pressure differential and the temperature change, is detected using another sensor.

A predetermined mathematical relationship exists between the pressure differential and the strains. Therefore, the pressure differential may be readily known when the first and second strains are known. In this example, the strains detected by the sensors may each include the same contribution due to strain induced by the temperature change in the structure.

In another example of a method of measuring pressure in a well provided by the invention, the method includes the steps of applying a pressure differential and a temperature change to a structure positioned in a well, detecting a strain in the structure induced by the pressure differential and the temperature change using one sensor, and detecting another strain in the structure induced by the temperature change using another strain sensor.

The latter strain sensor does not detect strain induced in the structure by the pressure differential. However, a predetermined mathematical relationship does exist between the pressure differential and the strains. In this example, the difference between the strains equals the strain induced in the structure by the pressure differential, since each of the strains includes the same contribution due to the temperature change.

In yet another method of measuring pressure in a well, the method includes the steps of applying a pressure differential across a structure positioned in the well, detecting a strain in the structure in one direction using a strain sensor, detecting a different strain in the structure in another direction using another strain sensor, and calculating the pressure differential using a predetermined mathematical relationship between the pressure differential and the strains.

Specific examples are described below of various sensor systems provided by the invention. In one example, a sensor system includes a structure having multiple portions. A pressure differential is applied across one portion, the pressure differential existing between surfaces formed on the portion.

Strain sensors detect strain in the structure induced by a temperature change in the well. One strain sensor detects strain in the one portion induced by the pressure differential. Another strain sensor detects strain in another portion of the structure due to the temperature change, but does not detect strain in the other portion induced by the pressure differential.

In another example, a sensor system is described which includes a structure having a pressure differential applied across a membrane of the structure. The pressure differential exists between well pressure applied to one side of the membrane and another pressure applied to another side of the membrane. Strain sensors detect strain in the membrane induced by the pressure differential and by a temperature change in the well. One strain sensor detects strain in the membrane in a first direction, and the other strain sensor detects strain in the membrane in a second direction.

In still another example, a sensor system is provided which includes a tubular structure having a pressure differential applied across its inner and outer surfaces. The pressure differential exists between well pressure applied to one of the inner and outer surfaces and another pressure applied to the other of the inner and outer surfaces. Strain sensors detect strain in the structure induced by the pressure differential and by a temperature change in the well. One strain sensor detects strain in the structure in a first direction, and another strain sensor detects strain in the structure in a second direction.

In a further example of a sensor system provided by the invention, the sensor system includes a structure in which strain is induced in response to a pressure differential in a well and strain sensors attached to the structure and detecting strain in the structure when the pressure differential exists in the well. One strain sensor detects a strain in a direction in the structure, and another strain sensor detects another strain in another direction in the structure.

In each of the above examples, at least one of the strain sensors may be a fiber optic sensor. The fiber optic sensor may comprise an interferometer or fiber grating. Any of a wide variety of fiber optic sensors may be used.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
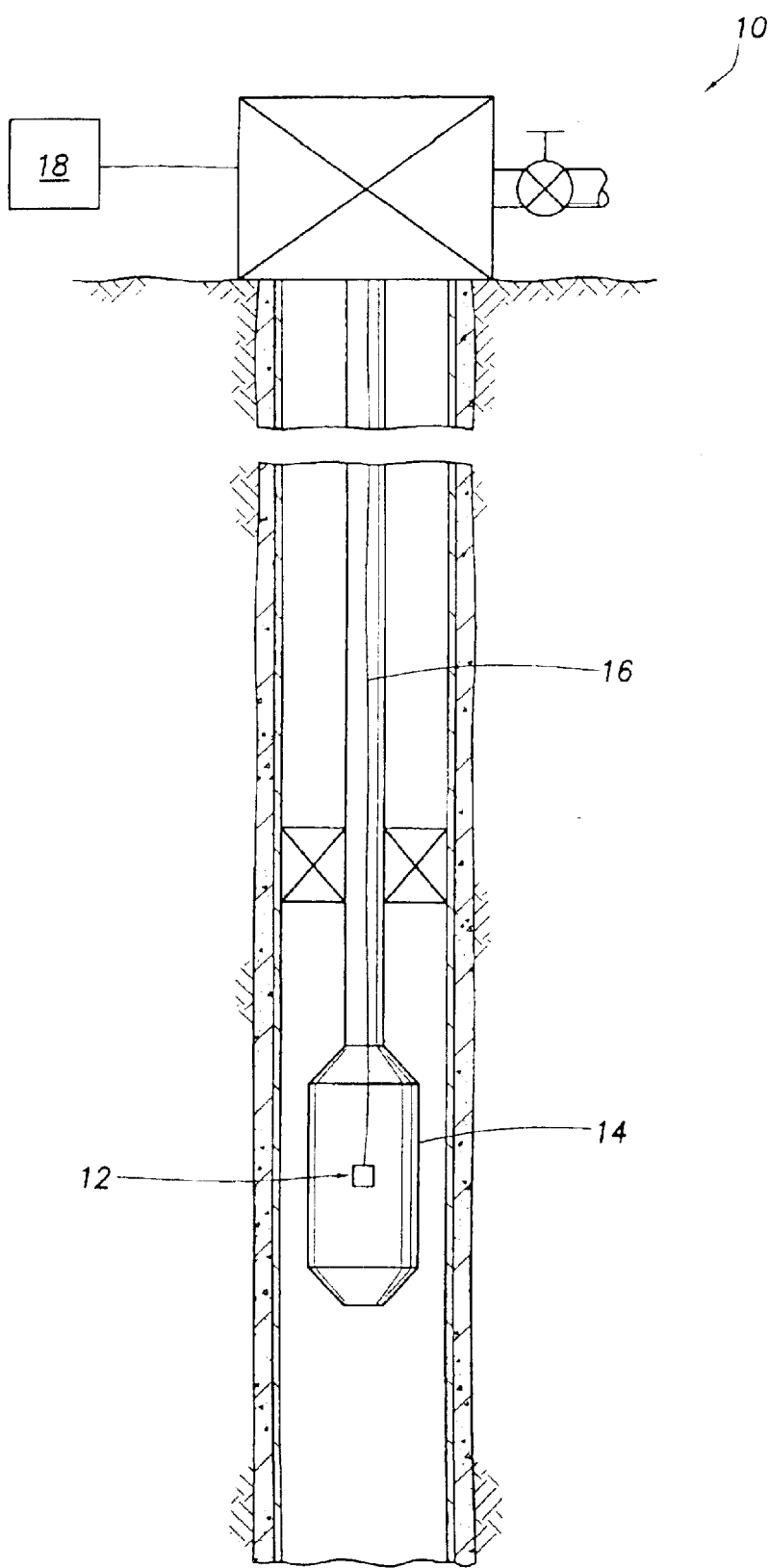
FIG. 1 is a schematic view of a method embodying principles of the present invention.

Representatively illustrated in FIG. 1 is a method 10 which embodies principles of the present invention. In the following description of the method 10 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

In the method 10, a sensor system 12 is positioned in a well for measuring pressure and temperature during operations in the well. As depicted in FIG. 1, the sensor system 12 is conveyed into the well attached to an item of equipment 14, such as a drill stem testing tool. However, it is to be clearly understood that the sensor system 12 may be otherwise positioned in the well, and may be used in well operations other than drill stem testing, in other methods embodying principles of the invention.

Lines 16 extend from the sensor system 12 to surface data acquisition equipment 18. The lines 16 may be any type of data transmission lines, such as electrical lines, fiber optic lines, hydraulic lines, etc., and the lines may also perform other functions, such as power source, control, etc. Alternatively, data transmission and any of the other functions of the lines 16 may be provided by wireless means, such electromagnetic, acoustic, pressure pulse or other type of telemetry.

Preferably, the sensor system 12 includes one or more fiber optic sensors, and so the lines 16 in the method 10 may conveniently be fiber optic lines extending into the well between the sensor system and the data acquisition equipment 18. In that case, the equipment 18 could include the appropriate means for optical communication, such as one or more lasers, photoelectric detectors, etc., which are known to those skilled in the art. However, other configurations are available to transmit data between the sensor system 12 and the data acquisition equipment 18.

Figure 2:
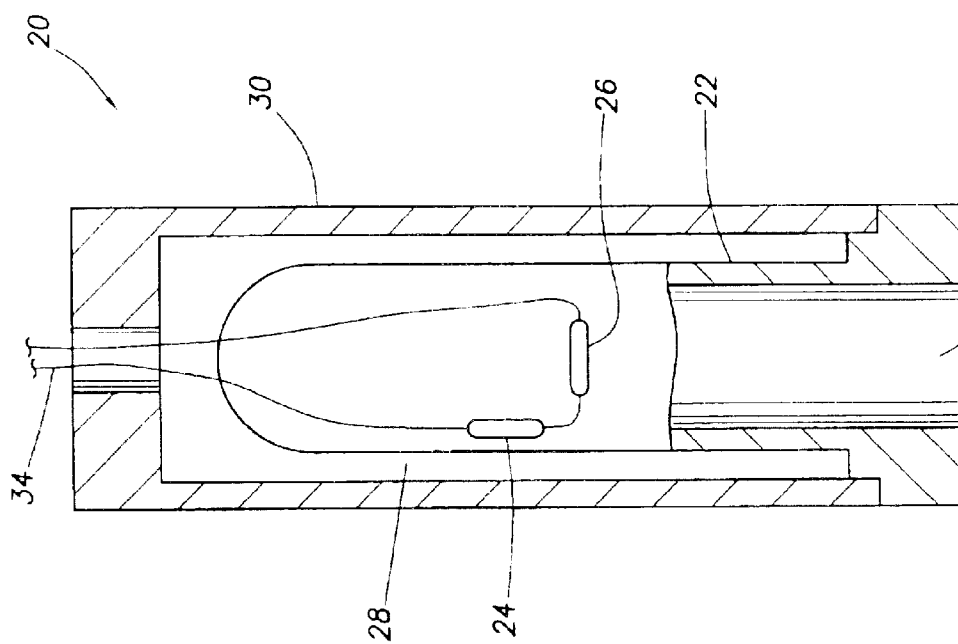
FIG. 2 is a schematic cross-sectional view of a sensor system embodying principles of the invention.

Referring additionally now to FIG. 2, an example is representatively illustrated of a sensor system 20 which may be used in the method 10. The sensor system 20 includes a tubular structure 22 in which strain is induced by a pressure differential and temperature change in the well. The strain is detected by strain sensors 24, 26.

Temperature change induces strain in the structure 22 in the sense that temperature change causes a dimensional change which is detected as a strain in the structure by the strain sensors 24, 26.

As depicted in FIG. 2, the structure 22 is preferably a closed-end hollow cylinder, whose length is at least several times its outer diameter, and whose wall thickness is relatively thin. In this manner, hoop and axial strain in the structure 22 due to a pressure differential between the interior and exterior surfaces of the structure may be readily calculated using known mathematical relationships, and contributions due to edge effects, discontinuities, etc. are reduced or eliminated. However, it should be clearly understood that principles of the invention may be incorporated into sensor systems in which pressure responsive structures have other shapes, and in which strains have other mathematical relationships to pressure applied to the structure.

For the closed-end tubular structure 22 depicted in FIG. 2, axial strain due to a pressure differential across interior and external surfaces of the structure may be calculated using the following formula:

$$\varepsilon_{zz} = \frac{1}{E}\left(\frac{((2\upsilon - 1)P_i + \upsilon P_o)r_i^2 - 2\upsilon P_o r_o^2}{r_i^2 - r_o^2}\right)$$

Hoop strain due to the pressure differential may be calculated using the following formula:

$$\varepsilon_{\theta\theta} = \frac{1}{E}\left(\frac{((2\upsilon - 1)P_i - \upsilon P_o)r_i^2 r^2 - ((\upsilon - 1)P_o r^2 + (1 + \upsilon)(P_i - P_o)r_i^2)r_o^2}{r^2(r_o^2 - r_i^2)}\right)$$

It will be readily appreciated that, if the dimensions of the structure 22 are known, appropriate values for Young's modulus (E) and Poisson's ratio (υ) are known for the corresponding structure material, and the axial and hoop strains ($\varepsilon_{zz}$, $\varepsilon_{\theta\theta}$) are known from the strain sensors 24, 26, then the pressure differential across the structure may be readily calculated using the above mathematical relationships.

If a temperature change in the well occurs, the strains as detected by the strain sensors 24, 26 may vary. Contraction or expansion of the structure 22 induced by the temperature change will be detected as strain in the structure by the strain sensors 24, 26. However, since this contraction or expansion is isotropic in the structure, the same strain contribution due to the temperature change will be detected by each of the strain sensors 24, 26. Therefore, this contribution due to the temperature change may be conveniently mathematically eliminated from the strains detected by the strain sensors 24, 26.

Note that the strain sensors 24, 26 are preferably positioned very close to each other on the structure 22, so that they each sense strain due to the same temperature changes, i.e., they are attached to portions of the structure at the same temperature. It may be preferable to position each of the strain sensors 24, 26 at the same longitudinal distance between opposite ends of the structure 22.

As depicted in FIG. 2, the strain sensor 24 is oriented longitudinally relative to the tubular structure 22 and the strain sensor 26 is oriented circumferentially relative to the structure. The strain sensor 24 is used to detect axial strain in the structure 22 and the strain sensor 26 is used to detect hoop strain in the structure.

The strain sensors 24, 26 are orthogonal relative to each other and are positioned approximately midway between opposite ends of the structure 22. For clarity of illustration in FIG. 2, the sensors 24, 26 are depicted on the same lateral side of the structure 22 and offset longitudinally with respect to each other. However, preferably the sensors 24, 26 are each centered at the same longitudinal position on the structure 22, but offset radially with respect to each other by 180° (i.e., on opposite lateral sides of the structure 22). Of course, strain sensors may be otherwise oriented and otherwise positioned, and may detect strains in other directions, without departing from the principles of the invention.

The strain sensors 24, 26 are depicted in FIG. 2 as being attached to an outer side surface of the structure 22 and positioned in an annular space 28 between the structure and an outer housing 30. Preferably, the annular space 28 is at atmospheric pressure. Pressure in the well is admitted into an interior bore 32 of the structure 22.

Thus, the pressure differential across the structure 22, which causes axial and hoop strain in the strain sensors 24, 26, is the difference between well pressure in the bore 32 and atmospheric pressure in the annulus 28. However, it should be understood that, in other sensor systems incorporating principles of the invention, the pressure differential could be due to other pressures acting on the structure 22 in other ways. For example, the annulus 28 could be at a pressure other than atmospheric pressure, the well pressure could be applied external to the structure 22, etc.

As used herein, the term "well pressure" refers to a pressure to which the sensor system 20 is exposed in a well, and which it is desired to measure. Thus, well pressure may be a pressure in the interior of a wellbore, a pressure from the exterior of the wellbore, pressure in an item of equipment in a well, etc.

Where the strain sensors 24, 26 are fiber optic sensors, a fiber optic line 34 may be used for communication. Either or both of the strain sensors 24, 26 may be an interferometric fiber optic sensor in which reflection or absorption of specific light wavelengths varies depending on the strain experienced by the sensor. For example, the sensor may include a fiber Bragg grating, a pi-shifted fiber Bragg grating, a long period grating, a co-located fiber Bragg grating and pi-shifted fiber Bragg grating, a fiber Bragg laser, an intrinsic or extrinsic Fabry-Perot interferometer, a Michelson interferometer, a Mach-Zehnder interferometer, a fiber ring resonator, etc. Of course, other types of strain sensors may be used, such as metal foil strain gauges, etc.

Figure 3:
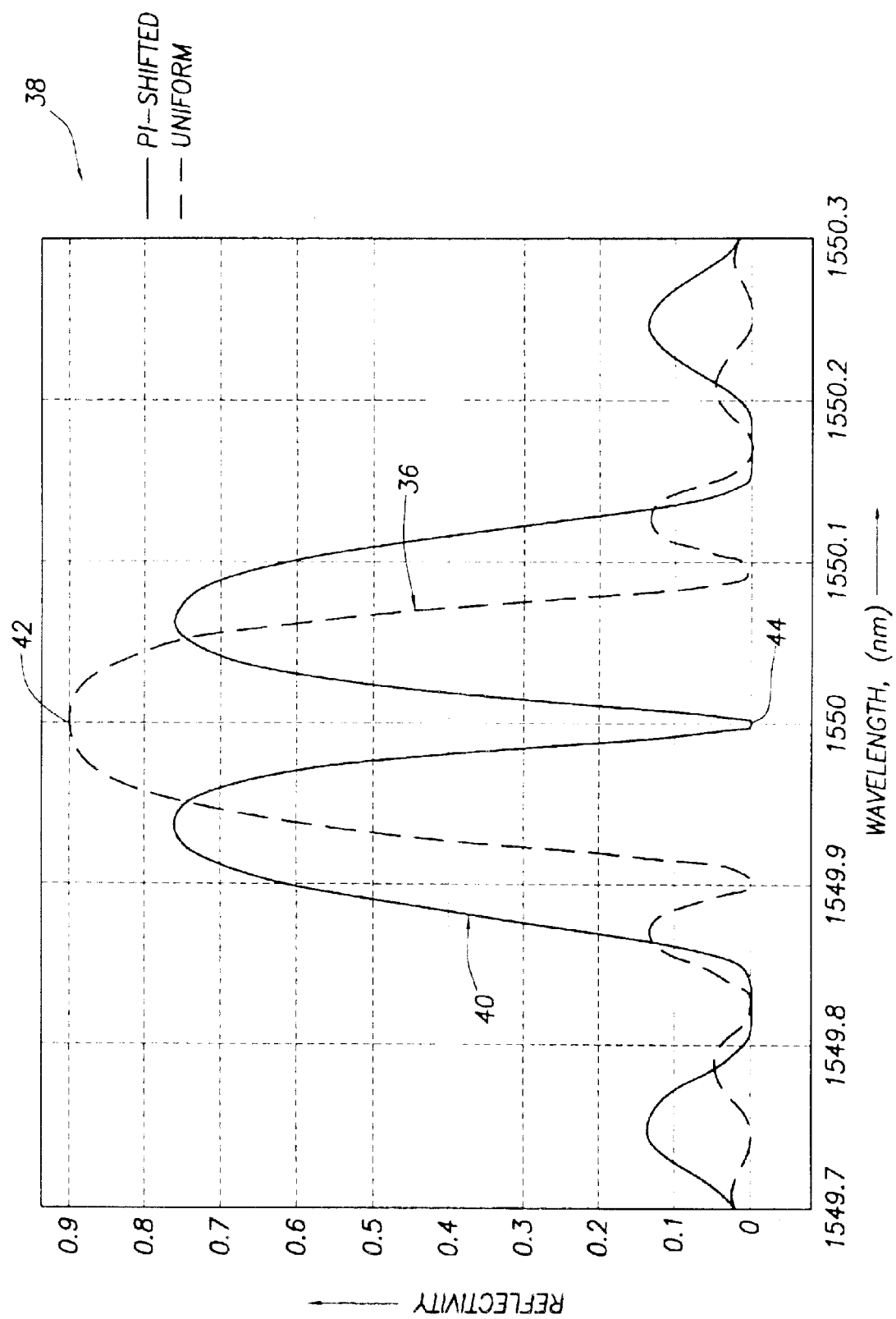
FIG. 3 is a graph representative of reflectivity vs. wavelength for fiber optic sensors of the sensor system of FIG. 2.

Referring additionally now to FIG. 3, a graph 38 is representatively illustrated of reflectivity vs. wavelength for two types of fiber optic strain sensors. A plot 36 for a uniform fiber Bragg grating is shown as a dashed line in the graph 38, and a plot 40 for a pi-shifted fiber Bragg grating is shown as a solid line in the graph.

Note that the uniform fiber Bragg grating plot 36 has a peak 42 in reflectivity at a wavelength of 1550 nm, while the pi-shifted fiber Bragg grating has a peak 44 in transmission (a dip in reflectivity) at that wavelength. As the length of the sensor changes, the wavelength at which the peaks 42, 44 occur changes. Thus, these fiber optic sensors accurately measure strain by reflecting and transmitting certain light wavelengths. The pi-shifted fiber Bragg grating may be preferred over the uniform fiber Bragg grating since its peak 44 is narrower and more well defined.

Figure 4:
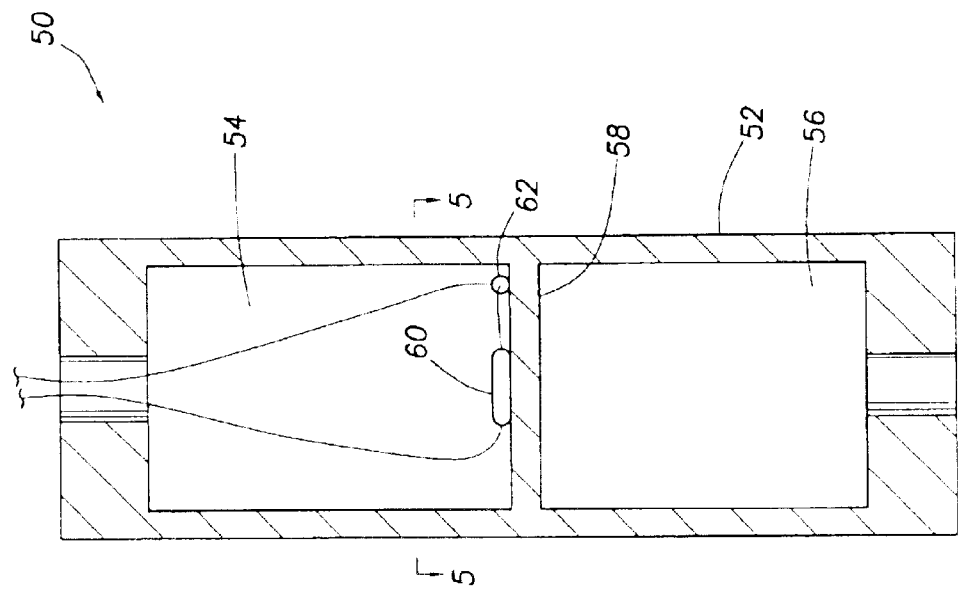
FIG. 4 is a schematic cross-sectional view of a second sensor system embodying principles of the invention.

Referring additionally now to FIG. 4, another sensor system 50 embodying principles of the invention is representatively illustrated. The sensor system 50 includes an outer housing 52 in which two chambers 54, 56 are separated by a membrane 58. As depicted in FIG. 4, the chambers 54, 56 and membrane 58 are integrally formed, but they could instead be formed of various elements and materials.

The membrane 58 is illustrated as being circular-shaped and having a uniform wall thickness. However, sensor systems incorporating principles of the invention may include membranes having other shapes and configurations. Preferably, the membrane 58 has a shape and configuration for which a predetermined mathematical relationship exists between strain detected by one strain sensor 60 and strain detected by another strain sensor 62 attached to the membrane.

The strain sensors 60, 62 may be similar to the strain sensors 24, 26 described above. In particular, the strain sensors may be fiber optic strain sensors.

For the membrane 58 of the sensor system 50, the strain sensor 60 is attached centrally on the membrane, and the strain sensor 62 is attached peripherally on the membrane. A mathematical relationship between a pressure differential across opposite sides of the membrane 58 and the strains as detected by the strain sensors 60, 62 may be derived theoretically, using tools, such as finite element analysis or neural networks, or the relationship may be derived emperically or through statistical analysis, etc.

Preferably, the upper chamber 54 exposed to an upper side of the membrane 58 has atmospheric pressure therein. The strain sensors 60, 62 are attached on the upper side of the membrane 58. Well pressure is admitted into the lower chamber 56, where it is in contact with a lower side of the membrane 58. Thus, the pressure differential across the membrane 58 is the difference between well pressure and atmospheric pressure on opposite sides of the membrane.

Figure 6:
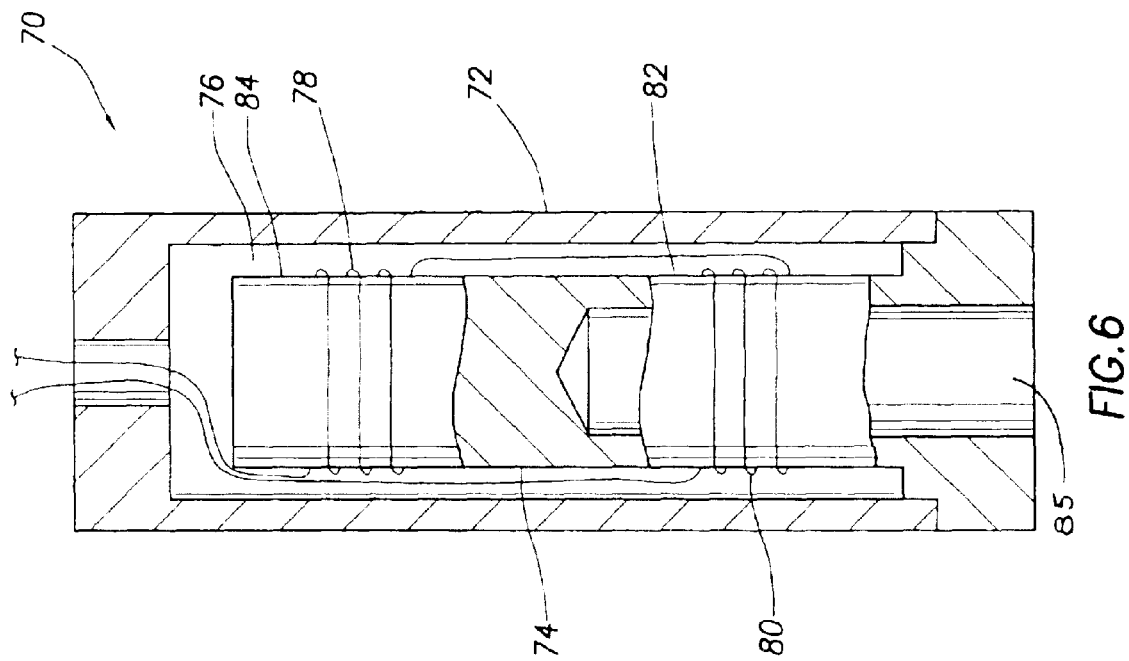
FIG. 6 is a schematic cross-sectional view of a third sensor system embodying principles of the invention.
Figure 5:
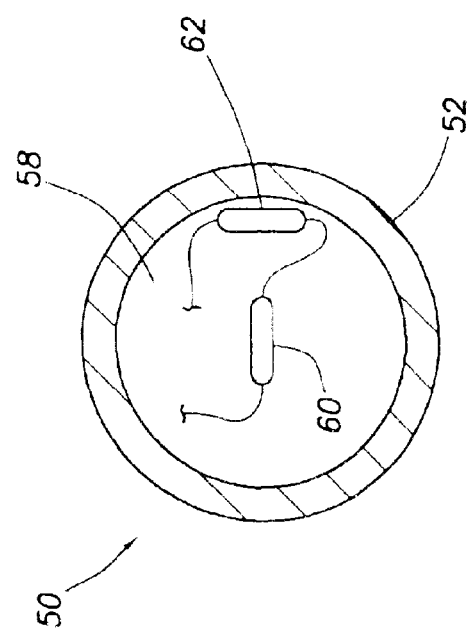
FIG. 5 is a cross-sectional view of the second sensor system, taken along line 5—5 of FIG. 4.

Referring additionally now to FIG. 6, another sensor system 70 embodying principles of the present invention is representatively illustrated. The sensor system 70 includes an outer housing 72 and an inner tubular structure 74 similar in some respects to the sensor system 20 shown in FIG. 2. An annular space 76 is positioned between the structure 74 and the housing 72, and two strain sensors 78, 80 are externally attached to the structure in the annular space.

The strain sensors 78, 80 are preferably fiber optic sensors similar to the sensors 24, 26, 60, 62 described above. In this embodiment, the sensors 78, 80 are wrapped multiple times about the structure 74, so that a larger magnitude of dimensional change (in the circumferential direction) in the structure is detected by each of the sensors as pressures and temperatures acting on the structure change. Of course, the strain sensors 78, 80 may be otherwise attached to the structure 74 in keeping with the principles of the invention. For example, the sensors 78, 80 could be attached to the structure 74 so that they detect axial strain, etc.

The structure 74 is tubular only in a lower portion 82 thereof. An upper portion 84 of the structure 74 is solid. Fluid pressure is admitted into the structure 74 via an opening 85 into the interior of the tubular lower portion 82. A differential between pressure in the annular space 76 and the fluid pressure admitted into the opening 85 acts only across the lower tubular portion 82 of the structure 74. The upper strain sensor 78, thus, does not detect strain induced in the structure 74 by the pressure differential.

Instead, the upper strain sensor 78 detects strain in the structure 74 induced only by temperature change. The lower strain sensor 80 detects strain induced both by the pressure differential and by the temperature change. The strain induced by the temperature change in the structure 74 is preferably detected the same by each of the strain sensors 78, 80 (for example, by using the same type of strain sensor for both of the sensors 78, 80, mounting the sensors similarly on the structure, etc.). Therefore, the strain in the structure 74 due only to the pressure differential may be readily determined by finding the difference between the strains detected by the sensors (i.e., strain detected by lower strain sensor 80− strain detected by upper strain sensor 78= strain due to pressure differential).

A predetermined relationship between the pressure differential and the strain due to the pressure differential (e.g., the mathematical relationships described above) may then be used to calculate the pressure differential. However, it should be understood that sensor systems incorporating principles of the invention may be differently configured so that strain sensors thereof detect other strains in a structure.

Of course, a person skilled in the art would, upon a careful consideration of the above description of representative embodiments of the invention, readily appreciate that many modifications, additions, substitutions, deletions, and other changes may be made to the specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A subterranean well sensor system, comprising:
a structure in which strain is induced in response to a pressure differential in the well; approximately atmospheric pressure being applied to the structure in the well; and
first and second strain sensors attached to the structure and detecting strain in the structure when the pressure differential exists in the well, the first strain sensor detecting a first strain in a first direction in the structure, and the second strain sensor detecting a second strain in a second direction in the structure.

2. The sensor system according to claim 1, wherein a predetermined mathematical relationship exists between the pressure differential, the first strain and the second strain.

3. The sensor system according to claim 1, wherein strain is induced in the structure in response to a change in temperature in the well, and wherein at least one of the first and second strains includes strain induced in the structure due to the temperature change.

4. The sensor system according to claim 3, wherein each of the first and second strains includes strain induced in the structure due to the temperature change.

5. The sensor system according to claim 1, wherein each of the first and second strains includes strain induced in the structure due to the pressure differential.

6. The sensor system according to claim 1, wherein only one of the first and second strains includes strain induced in the structure due to the pressure differential.

7. The sensor system according to claim 1, wherein the structure includes a hollow cylinder, and wherein the first strain sensor detects axial strain in the cylinder and the second strain sensor detects hoop strain in the cylinder induced by the pressure differential.

8. The sensor system according to claim 7, wherein the first and second strain sensors are each centered at approximately a same longitudinal position on the cylinder, and the first and second sensors are radially offset with respect to each other by approximately 180°.

9. The sensor system according to claim 7, wherein each of the first and second strain sensors detects strain in the cylinder induced by a temperature change in the well.

10. The sensor system according to claim 9, wherein each of the first and second strains includes strain induced in the cylinder by the pressure differential and by the temperature change.

11. The sensor system according to claim 10, wherein a predetermined mathematical relationship exists between the pressure differential and the first and second strains, so that the pressure differential may be calculated when the first and second strains are known.

12. The sensor system according to claim 7, wherein the pressure differential exists between an interior and an exterior of the cylinder.

13. A subterranean well sensor system, comprising:
a structure in which strain is induced in response to a pressure differential in the well; and
first and second strain sensors attached to the structure and detecting strain in the structure when the pressure differential exists in the well, the first strain sensor detecting a first strain in a first direction in the structure, and the second strain sensor detecting a second strain in a second direction in the structure,
wherein the structure includes a hollow cylinder, wherein the first strain sensor detects axial strain in the cylinder and the second strain sensor detects hoop strain in the cylinder induced by the pressure differential, wherein the pressure differential exists between an interior and exterior of the cylinder, and wherein well pressure is applied to the interior of the cylinder and approximately atmospheric pressure is applied to the exterior of the cylinder.

14. The sensor system according to claim 1, wherein the structure includes a pressure responsive membrane, and wherein each of the first and second strain sensors detects strain in the membrane induced by the pressure differential.

15. The sensor system according to claim 14, wherein each of the first and second strain sensors detects strain in the membrane induced by a temperature change in the well.

16. The sensor system according to claim 15, wherein each of the first and second strains includes strain induced in the cylinder by the pressure differential and by the temperature change.

17. The sensor system according to claim 16, wherein a predetermined mathematical relationship exists between the pressure differential and the first and second strains, so that the pressure differential may be calculated when the first and second strains are known.

18. The sensor system according to claim 14, wherein the pressure differential exists between opposite sides of the membrane.

19. The sensor system according to claim 18, wherein well pressure is applied to one side of the membrane and approximately atmospheric pressure is applied to the other side of the membrane.

20. The sensor system according to claim 1, wherein the structure includes first and second portions, and wherein the first strain sensor detects strain in the first portion and the second strain sensor detects strain in the second portion.

21. The sensor system according to claim 20, wherein the pressure differential induces strain in the first portion, but the pressure differential does not induce strain in the second portion.

22. The sensor system according to claim 20, wherein each of the first and second strain sensors detects strain in the structure induced by a temperature change in the well.

23. The sensor system according to claim 22, wherein the first strain includes strain induced in the structure by the pressure differential and by the temperature change, but the second strain does not include strain induced in the structure by the pressure differential.

24. The sensor system according to claim 23, wherein a predetermined mathematical relationship exists between the pressure differential and the first and second strains, so that the pressure differential may be calculated when the first and second strains are known.

25. The sensor system according to claim 20, wherein the pressure differential exists between an interior and an exterior of the structure.

26. The sensor system according to claim 25, wherein well pressure is applied to the interior of the structure and approximately atmospheric pressure is applied to the exterior of the structure.

27. The sensor system according to claim 1, wherein at least one of the first and second strain sensors is a fiber optic sensor.

28. The sensor system according to claim 27, wherein the fiber optic sensor is an interferometric fiber optic sensor.

29. The sensor system according to claim 27, wherein the fiber optic sensor comprises a fiber Bragg grating.

30. The sensor system according to claim 27, wherein the fiber optic sensor comprises a pi-shifted fiber Bragg grating.

31. The sensor system according to claim 27, wherein the fiber optic sensor comprises a long period grating.

32. The sensor system according to claim 27, wherein the fiber optic sensor comprises a fiber Bragg laser.

33. The sensor system according to claim 27, wherein the fiber optic sensor comprises a selected one of an intrinsic and extrinsic Fabry-Perot interferometer.

34. The sensor system according to claim 27, wherein the fiber optic sensor comprises a Michelson interferometer.

35. The sensor system according to claim 27, wherein the fiber optic sensor comprises a Mach-Zehnder interferometer.

36. The sensor system according to claim 27, wherein the fiber optic sensor comprises a co-located fiber Bragg grating and pi-shifted fiber Bragg grating.

37. The sensor system according to claim 27, wherein the fiber optic sensor comprises a fiber ring resonator.

38. A subterranean well sensor system, comprising:
a generally tubular structure having a pressure differential applied across its inner and outer surfaces, the pressure differential existing between well pressure applied to one of the inner and outer surfaces and a second predetermined pressure applied to the other of the inner and outer surfaces; and
first and second strain sensors, each of the first and second strain sensors detecting strain in the structure induced by the pressure differential and strain induced in the structure by a temperature change in the well, the first strain sensor detecting strain in the structure in a first direction, and the second strain sensor detecting strain in the structure in a second direction different from the first direction,
wherein the structure includes a hollow cylinder, wherein the first strain sensor detects axial strain in the cylinder, and wherein the second strain sensor detects hoop strain in the cylinder.

39. The sensor system according to claim 38, wherein the first and second strain sensors are each centered at approximately a same longitudinal position on the cylinder, and the first and second sensors are radially offset with respect to each other by approximately 180°.

40. A subterranean well sensor system, comprising:
a hollow cylindrical structure having a pressure differential applied across its inner and outer surfaces, the pressure differential existing between well pressure applied to one of the inner and outer surfaces and a second predetermined pressure applied to the other of the inner and outer surfaces; and
first and second strain sensors, each of the first and second strain sensors detecting strain in the structure induced by the pressure differential and strain induced in the structure by a temperature change in the well, the first strain sensor detecting strain in the structure in a first direction, and the second strain sensor detecting strain in the structure in a second direction different from the first direction,
wherein the second predetermined pressure is contained within an annular space between the structure and an outer housing.

41. The sensor system according to claim 40, wherein the first and second strain sensors are positioned in the annular space and are attached to the outer surface of the structure.

42. A subterranean well sensor system, comprising:
a generally tubular structure having a pressure differential applied across its inner and outer surfaces, the pressure differential existing between well pressure applied to one of the inner and outer surfaces and a second predetermined pressure applied to the other of the inner and outer surfaces; and
first and second strain sensors, each of the first and second strain sensors detecting strain in the structure induced by the pressure differential and strain induced in the structure by a temperature change in the well, the first strain sensor detecting strain in the structure in a first direction, and the second strain sensor detecting strain in the structure in a second direction different from the first direction,
wherein the second predetermined pressure is approximately atmospheric pressure.

43. The sensor system according to claim 38, wherein at least one of the first and second strain sensors is a fiber optic sensor.

44. The sensor system according to claim 43, wherein the fiber optic sensor is an interferometric fiber optic sensor.

45. The sensor system according to claim 43, wherein the fiber optic sensor comprises a fiber Bragg grating.

46. The sensor system according to claim 43, wherein the fiber optic sensor comprises a pi-shifted fiber Bragg grating.

47. The sensor system according to claim 43, wherein the fiber optic sensor comprises a long period grating.

48. The sensor system according to claim 43, wherein the fiber optic sensor comprises a fiber Bragg laser.

49. The sensor system according to claim 43, wherein the fiber optic sensor comprises a selected one of an intrinsic and extrinsic Fabry-Perot interferometer.

50. The sensor system according to claim 43, wherein the fiber optic sensor comprises a Michelson interferometer.

51. The sensor system according to claim 43, wherein the fiber optic sensor comprises a Mach-Zehnder interferometer.

52. The sensor system according to claim 43, wherein the fiber optic sensor comprises a co-located fiber Bragg grating and pi-shifted fiber Bragg grating.

53. The sensor system according to claim 43, wherein the fiber optic sensor comprises a fiber ring resonator.

54. A method of measuring pressure in a subterranean well, the method comprising the steps of:

applying a pressure differential across a structure positioned in the well, approximately atmospheric pressure being applied to the structure within the well;

detecting a first strain in the structure in a first direction using a first strain sensor;

detecting a second strain different from the first strain in the structure in a second direction using a second strain sensor; and calculating the pressure differential using a predetermined mathematical relationship between the pressure differential and the first and second strains.

55. The method according to claim 54, further comprising the step of applying a change in temperature to the structure in the well, and wherein each of the first and second strains includes strain induced by the temperature change.

56. The method according to claim 55, wherein each of the first and second strains includes the same strain induced by the temperature change.

57. The method according to claim 55, wherein the calculating step further comprises subtracting strain induced by the temperature change from the first and second strains.

58. The method according to claim 54, wherein in the first and second strain detecting steps, the first and second directions are orthogonal to each other.

59. The method according to claim 54, wherein in the pressure differential applying step, the structure includes a generally tubular portion and the pressure differential is applied between inner and outer surfaces of the tubular portion.

60. The method according to claim 59, wherein in the first strain detecting step, the first strain is an axial strain in the tubular portion, and wherein in the second strain detecting step, the second strain is a hoop strain in the tubular portion.

61. The method according to claim 54, wherein in the first and second strain detecting steps, at least one of the first and second strain sensors is a fiber optic sensor.

62. A method of measuring pressure in a subterranean well, the method comprising the steps of:

applying a pressure differential across a structure positioned in the well, approximately atmospheric pressure being applied to the structure within the well;

applying a temperature change to the structure in the well;

detecting a first strain in the structure induced by the pressure differential and the temperature change using a first strain sensor; and detecting a second strain different from the first strain in the structure induced by the pressure differential and the temperature change using a second strain sensor, a predetermined mathematical relationship existing between the pressure differential and the first and second strains.

63. The method according to claim 62, wherein each of the first and second strains includes the same strain induced by the temperature change.

64. The method according to claim 62, wherein in the first strain detecting step, the first strain sensor is attached to a generally tubular portion of the structure.

65. The method according to claim 64, wherein in the second strain detecting step, the second strain sensor is attached to the tubular portion of the structure.

66. The method according to claim 65, wherein the first and second strain sensors are each centered at approximately a same longitudinal position on the tubular portion, and the first and second sensors are radially offset with respect to each other by approximately 180°.

67. The method according to claim 65, wherein in the first and second strain detecting steps, the first strain sensor senses hoop strain in the tubular portion and the second strain sensor senses axial strain in the tubular portion.

* * * * *